(12) United States Patent
Fosseng

(10) Patent No.: US 6,942,786 B1
(45) Date of Patent: Sep. 13, 2005

(54) CLEANING DEVICE FOR WASTE WATER

(75) Inventor: Audun Fosseng, Salsnes (NO)

(73) Assignee: Salnes Filter AS, Salsnes (NO)

( * ) Notice: Subject to any disclaimer, the term of this patent is extended or adjusted under 35 U.S.C. 154(b) by 0 days.

(21) Appl. No.: 10/182,971

(22) PCT Filed: Feb. 3, 2000

(86) PCT No.: PCT/NO00/00032

§ 371 (c)(1),
(2), (4) Date: Oct. 7, 2002

(87) PCT Pub. No.: WO01/56681

PCT Pub. Date: Aug. 9, 2001

(51) Int. Cl.[7] .................... B01D 33/04; B01D 33/048
(52) U.S. Cl. .................. 210/97; 210/391; 210/393; 210/400; 210/401; 239/597; 239/601
(58) Field of Search .................. 210/400, 401, 210/391, 407, 408, 409, 410, 411, 108, 86, 210/393, 97; 239/597, 601

(56) References Cited

U.S. PATENT DOCUMENTS

| | | | |
|---|---|---|---|
| 3,012,677 A | * | 12/1961 | Hungate .................. 210/107 |
| 3,464,563 A | * | 9/1969 | Gonzalez et al. ........... 210/400 |
| 4,008,158 A | * | 2/1977 | Davis .................. 210/386 |
| 4,242,205 A | * | 12/1980 | Hirs .................. 210/400 |
| 4,468,320 A | * | 8/1984 | Schmidt .................. 210/97 |
| 5,202,017 A | | 4/1993 | Hunter |

FOREIGN PATENT DOCUMENTS

| | | |
|---|---|---|
| FR | 1352960 | 1/1964 |
| WO | WO87/02266 | 4/1987 |
| WO | WO94/26387 | 11/1994 |

* cited by examiner

*Primary Examiner*—Terry K. Cecil
(74) *Attorney, Agent, or Firm*—Bracewell & Giuliani LLP

(57) ABSTRACT

Cleaning device having an endless filtering belt (31) guided through a waste water container (33) for filtering of waste water. The filtering belt is guided over a series turn rollers (32, 34, 36, 37) so that the belt in a certain region runs substantially horizontally with the filtrate faced downwards. Within this region there is a rod shaped blowoff device (43) for blowing air towards the filtering belt. Below the blowoff device (44) there is arranged a screw conveyor (42) for removing residues dislodged from the filter mesh. The filtering belt (31) is located adjacent to a transmission belt (51) and is pressed against the same by a clamping rail (58) within the rising section (38) of the filtering belt. The device is provided with a control device (4) adapting the filtering belt movement with the waste water supply, thus keeping the waste water surface below a certain level to provide a high degree of dewatering within the upwards rising section of the filtering belt (31). The blowoff device (43) is shaped to produce a knife shaped air beam directed towards the filtering belt from a sufficiently short distance to effect substantially full penetration through the openings of the filtering belt. The lateral edges of the filtering belt are covered by a tight cover band (66) pressed downwards by a soft elastic pressure lip (64).

6 Claims, 4 Drawing Sheets

CLEANING DEVICE FOR WASTE WATER

Figure 1:
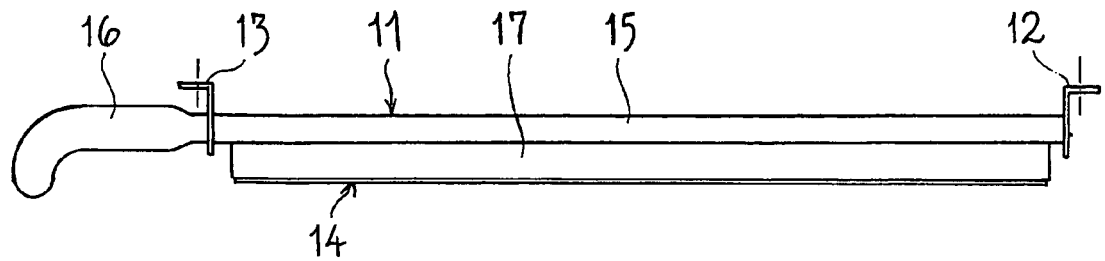

The invention is related to a waste water cleaning device in accordance with the introductory part of patent claim 1 and a blowoff device for blowing air or another gas towards a mesh shaped cleaning belt arranged within such a cleaning device, thus removing contamination from the cleaning belt.

BACKGROUND

Cleaning devices having endless filtering belts are subjected to deposit of certain types of filtering residue resulting in clogging of the band or belt, such as filtering residues in municipal waste water and starch residue in waste water from potato refinement plants.

U.S. Pat. No. 165,826 discloses a device that uses air blow from the underside of the filtering band to lift water and particles from the band and direct the water back to the band. This device is not capable of giving any satisfactory operation in cleaning plants of interest herein, i.e., cleaning of municipal waste water.

WO A87/02595 (Ericksson) describes blowing pressurized air or water from above towards a filtering belt and collecting the residue in a collecting chute. This form of residue removal has not been effective. Air blowing in this way is at best suitable for removal of dry filtrate not containing fat or similar compounds.

U.S. Pat. No. 4,921,608 solves this problem by spraying hot water vapour. However, this technical solution is both equipment and energy demanding and it is for that reason an efficient but costly implementation.

U.S. Pat. No. 178,608 describes a cleaning device having an endless filtering belt carried through a waste water container for filtering of waste water, wherein the filtering band is carried over numerous rollers in such a way that it, in a certain area runs substantially horizontally with the residue turned downwards. Within this area there is a rod shaped exhaust or blowoff device to effect an air blow towards the filtering belt. A blowoff device is arranged in parallel with the blowoff device and downstream to spray water jets towards the filtering band. This cleaning device has several weaknesses with regard to the cooperation between its separate modules. An example of the latter is causing the blowoff device, which has a particularly high energy demands to achieve satisfactory tearing-off effect. Moreover, the device has been subject to clogging because of particles moved into the blowing aperture.

Object

The main object of the invention is therefore to improve the cleaning device disclosed in U.S. Pat. No. 178608. Another object of the invention is to increase the cleaning throughput and cleaning efficiency. In that connection it is important to effect proper water removal from the filter mesh, irrespective of the quantity of waste water supplied and of the solid content of the waste water.

With regard to the filter mesh, it is important to guide the mesh in such a way that the speed can be varied without effecting any substantial wear. In other words, an object of the invention is to improve guidance and treatment of the filter mesh to ensure a long service life at varying speeds.

A particular object of the invention is to provide a blowoff device having improved efficiency with regard to the disengagement efficiency in order to remove deposits having a low solid content from the filter mesh. Another object is to obtain a high blowing air speed to decrease the energy demand and obtain effective cleaning in a larger mesh area, in order to prevent fat deposits, among others. Another object is to provide a blowing device which is less subject to clogging.

Invention

The essential features of the invention establish a low water content within the deposits guided from the filter mesh to the screw conveyor. The screw conveyor will then be able to perform an effective pressing of the solids to further decrease the water portion, which again decreases the handling problems with the residue waste.

The construction of the blowing device also contributes to increase the cleaning efficiency. As far as we are concerned, the increased cleaning efficiency is caused by the construction providing an advantageous combination of increased air speed and increased air jet width, which is effective to the cleaning belt.

First, the novel construction provides an increased air blow speed when it leaves the blowing device and passes through the filter mesh. This is particularly the case when the air blow pressure is at least 0.8 bar. The result is an increased mechanical effect because of the increased speed within the cleaning area and an effective operation across a larger width of the filter mesh. This provides increased cleaning effect and/or allows for reduction of air quantity or air pressure, thus resulting in a reduced energy demand.

Another advantage of the invention is that the air slot is substantially wider in the section contacting the cleaning belt, i.e., the filter mesh. When the filter mesh is moving there is a risk for particle movement into the air slot. By having a larger air slot, in accordance with the invention and producing a wider air jet at a higher speed, the problem with solid movement and sliding and deposit of contaminants from the cleaning belt will decrease, which again results in a more reliable operation and reduced maintenance.

EXAMPLE

The invention is illustrated in the drawings, wherein

Figure 2:
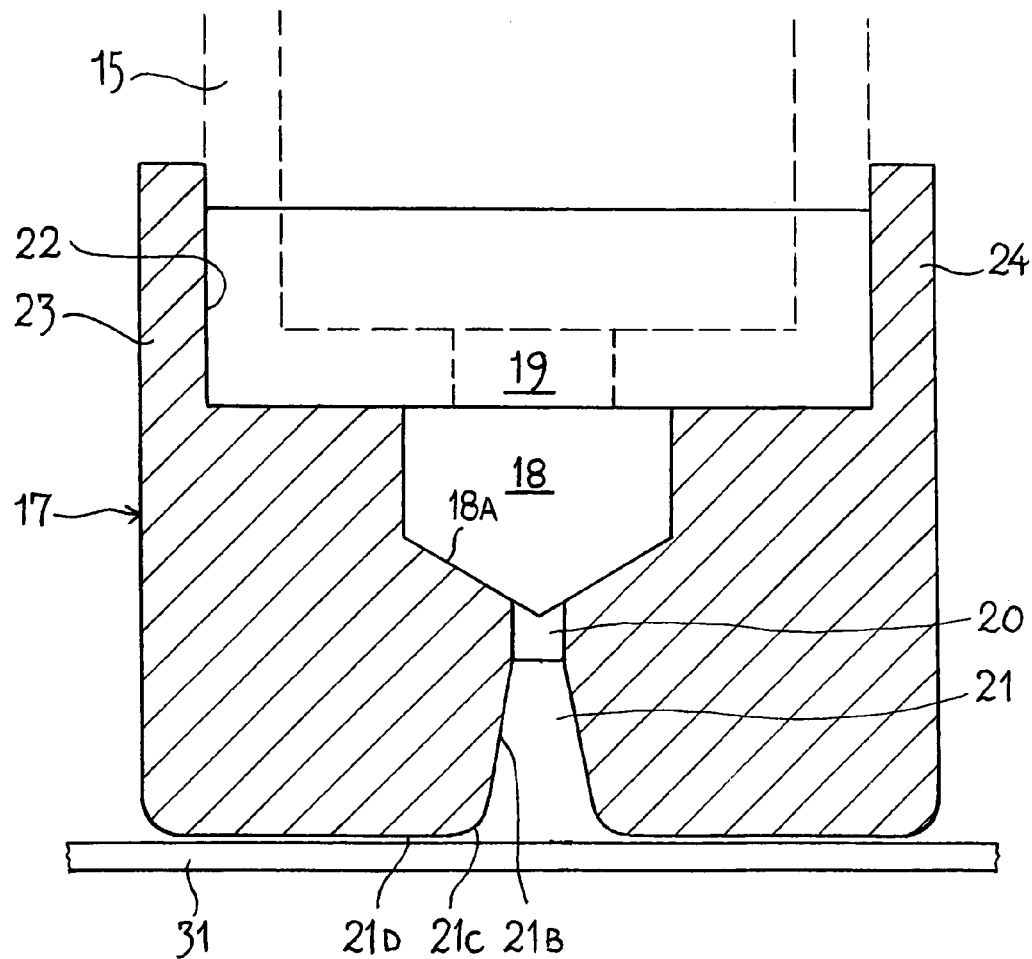
Figure 3:
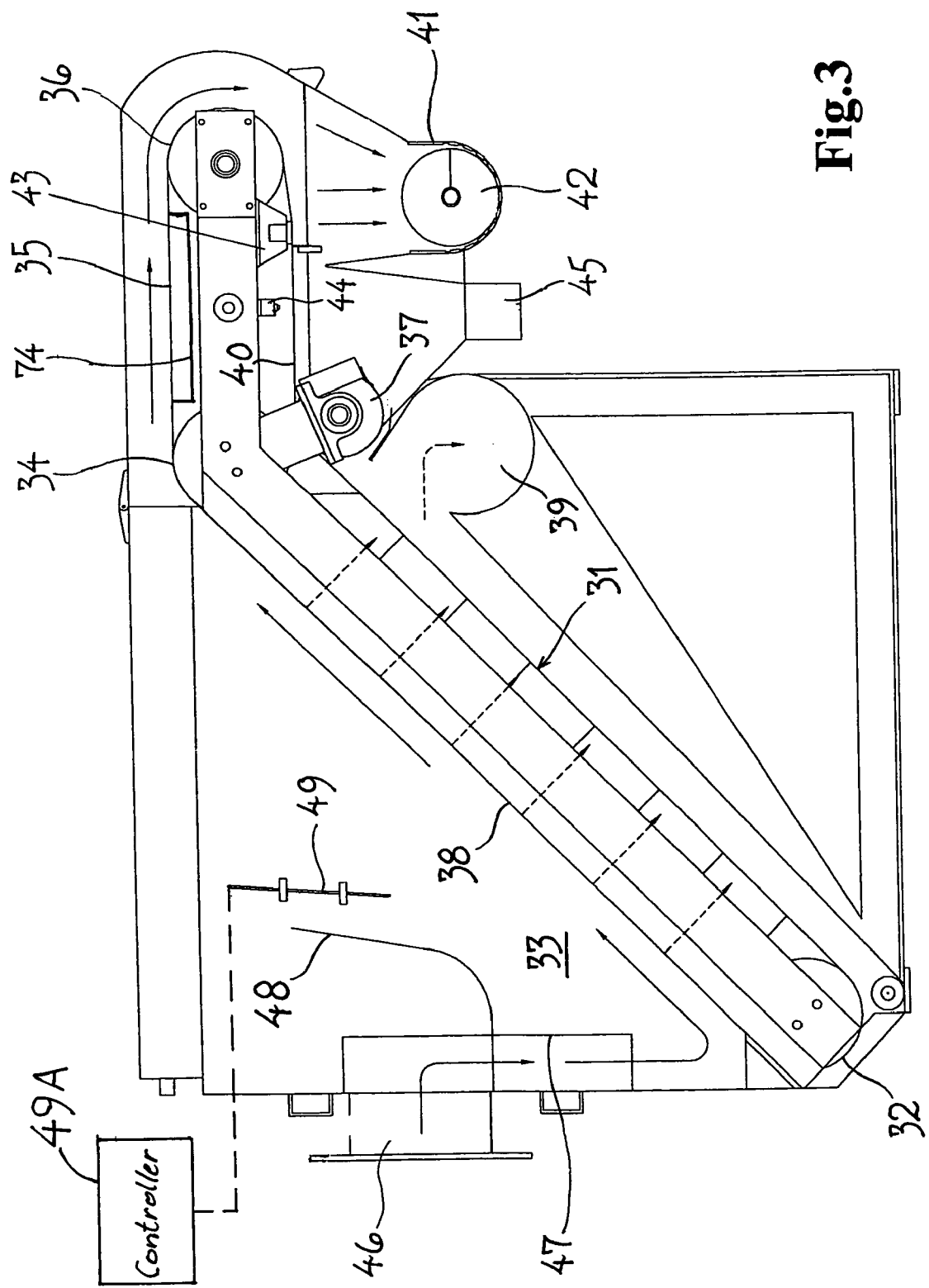
Figure 4:
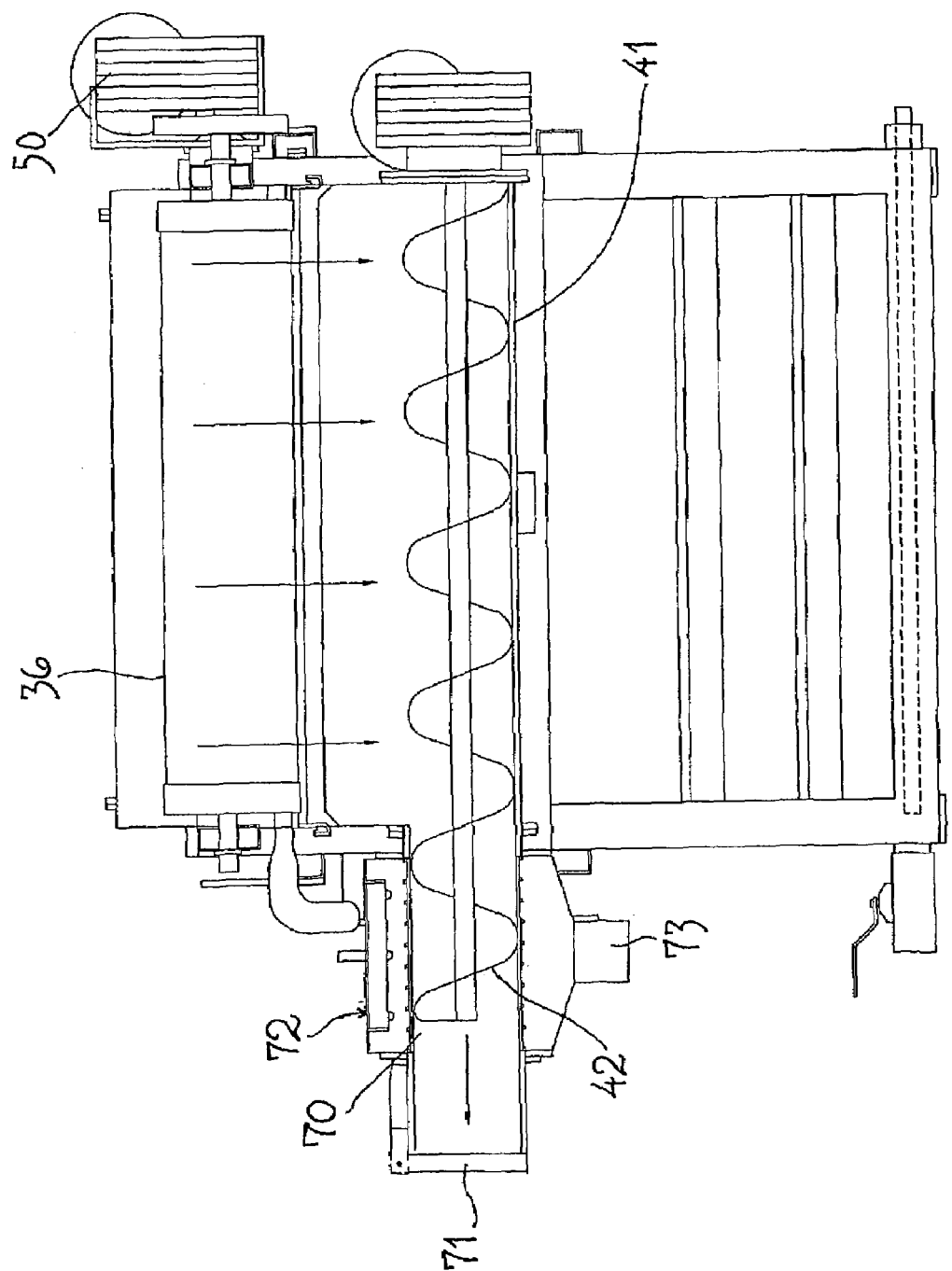
Figure 5:
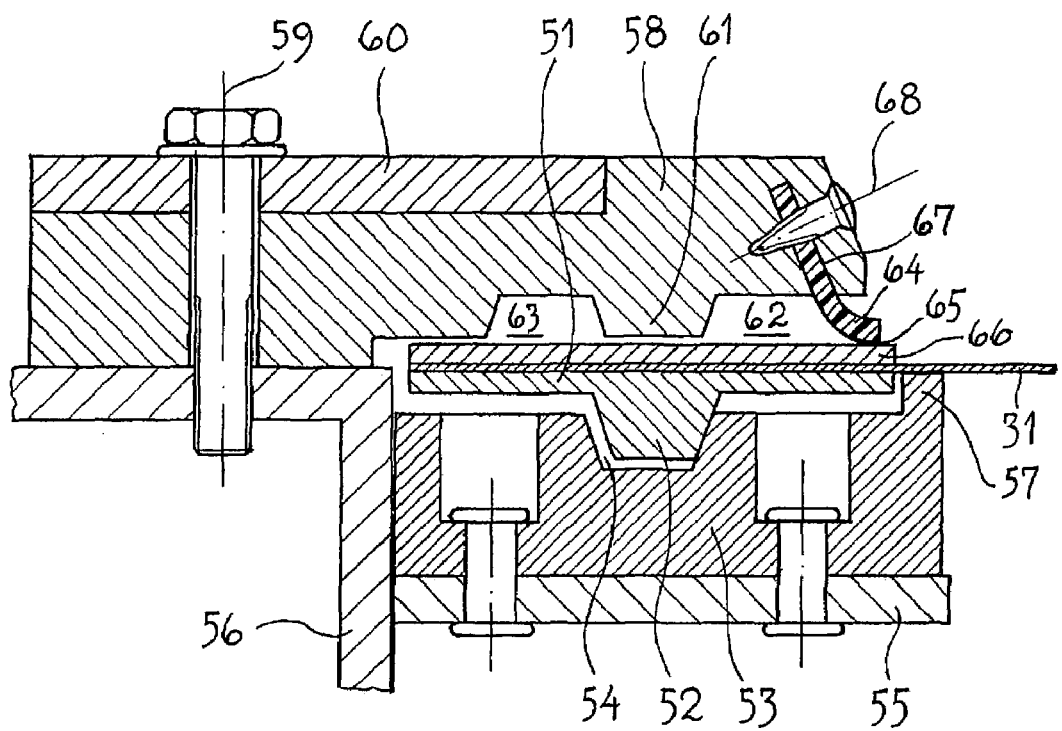

FIG. 1 illustrates a schematic side view of a blowing device in accordance with the invention for use with a cleaning device illustrated in FIGS. 3 and 4, FIG. 2 illustrates a cross section through the center part of the blowing device of FIG. 1, FIG. 3 illustrates a side view of a cleaning device in accordance with the invention, wherein the blowing device of FIG. 2 is attached, FIG. 4 illustrates a partially sectioned end view of the eject end of the cleaning device of FIG. 3 and, FIG. 5 illustrates a cross section through the guiding or clamping rails of the filter mesh edge.

FIG. 1 illustrates a rod shaped blowing device 11 provided with brackets 12 and 13 at each end thereof to facilitate mounting within a plant (not shown(, e.g., beneath and in contact with a cleaning belt 14 for waste water (FIG. 2). The cleaning belt 14 may be comprised of a filter mesh extending through an entry zone (not illustrated), e.g., for waste water, and further extending, having its rear side facing upwards, past the underlying blowing device 11, wherein deposits possibly containing fat are to be removed.

The blowing device 11 comprises a supply pipe 15, such as a rectangular pipe provided with a series of holes at its top side, connected to a pressurised air source (not illustrated). At one end of said pipe there is attached a pipe shaped angle piece 16. A nozzle rod 17 is arranged over the supply pipe 15, for example a polymer pipe, as illustrated in further detail in cross section in FIG. 2 and which constitutes a substantial part of the present invention.

FIG. 2 illustrates how the nozzle rod 17 comprises an elongate inlet chamber 18 which receives compressed air from the adjacent elongate supply pipe 15. The nozzle rod 17 can, for example, be screwed into the supply pipe 15 with a series of holes 19 in the resting surface towards the inlet chamber. The inlet chamber 18 can exhibit a width of 8 mm, and a bottom 18A converging with an opening angle of 120 degrees and forming an inlet manifold to a series of holes 20 extending through the nozzle rod, e.g., having a diameter of 2.5 mm, a length of 1–10 mm and a center distance of 4 mm.

The series of holes 20 open into an elongate outlet slit 21 having a width at the outlet of about 1:5 of the hole diameter and having a depth of about 5 times the narrowest width. The outlet slit 21 expands like a trumpet towards the outlet, i.e., having a diverging course, an intermediate section 21B having walls forming an opening angle of about 20 degrees, to an outlet section 21C having a rounded transition to the outer edge 21D. This construction will establish a modified flow regime at the decompression and the transition from the outlet slit 21 to the cleaning belt.

In accordance with the invention, firstly the air speed at the slit outlet 21C will increase, which again increases the volume of the air flowing through the cleaning belt. Accordingly, a stronger air flow is established, both with regard to intensity and size, as stated above.

In order to stabilize the nozzle rod 17 mechanically in relation to the supply pipe 15, the rod is provided with a groove 22, in the region at the inlet slit 18, forming elongate side flanges 23 and 24 being engaged with the supply pipe.

Numerous parameters of this construction can be modified in relation to the embodiment illustrated, such as the distance between the nozzle rod and cleaning belt, the length of the parallel section of the outlet slit, which may be zero, the opening angle of the outlet slit and the curved outlet section of the same.

The ratio between the compressing section 20 and the outlet section 21C is less than about 1:5, preferably less than about 1:10. The width of the outlet section is about 1:5 of the length of the diverging section 21B, 21C.

FIGS. 3 and 4 show a cleaning device in accordance with the invention having an endless filtering belt 31 guided over a lower turn roller 32, inclined upwards through a waste water container 33 to a first upper turn roller 34 and over a horizontal section 35 to a second upper turn roller 36 guiding the belt back below the horizontal section 35 to an underlying turn roller 37 below the first upper turn roller 34. From this position the filtering belt 31 extends downwards to the lower turn roller at the bottom of the waste water container 33. The inclined path 38 of the filtering belt 31 up through the waste water container is sealingly connected to check rails, illustrated in further detail in FIG. 5, forming the active filter area. The water flows through the filter and out into the waste water container and up to a laterally arranged end or outlet piece 39 at the upper edge of the waste water container. This is located below the first upper turn roller 34.

In the region between the second upper turn roller 36 and the underlying turn roller 37, the filtering belt 31 forms a web 40 with a reversed surface, to allow collected residue to fall down into a collecting gutter 14. Loose particles and other loose residue will, after having passed the second upper turn roller 36, fall freely and become collected by a transverse screw conveyor 42 transporting the filtrate residue transversely out to a suitable collecting means.

In order to remove sticking filtrate residue, a transverse blowing device 43 is arranged above the belt region and above the screw conveyor 42 and is connected to an air compressore 9 the latter not shown). This can be an elongate pipe provided with suitable outlet nozzles or outlet slits directed downwards to the upwards facing side of the filtering belt 31, i.e., the reverse in relation to the residue.

It has been shown that such a blowing device 43 can remove different types of deposits or residue which otherwise would have remained attached to the filtering belt and thus formed a filter cake which finally would have clogged the filtering belt. Some of this advantageous effect is assumed to be caused by the air heating which occurs at the blowout through substantially narrow nozzles or slits. This heating can occur without any substantial energy supply because of the high specific heat of the air, since the air blow provides a highly effective heat transfer to deposits on the filter belt.

An ejection pipe 44 for ejecting water jets to the filtering belt is located downstream of the blowing device 43. These water jets are capable of removing residue that is disengaged by the air flow but still attached to the filtering belt 31. For collecting of the water supplied and the last residue, a further transverse collecting gutter 45 with a transversely directed outlet pipe is arranged as an extension of the collecting gutter 41. The water from this trough is directed back to the waste water container.

A sensor 49 is located within the waste water container 33, such as an air pipe monitoring the counterpressure towards injected air, thus determining when the waste water level exceeds a certain level. Alternatively, the sensor can be a float or level indicator based upon sound waves. The sensor 49 is connected to a control system 49A for a driving motor 50 arranged at one end of the rear turn roller 36 for driving the filtering belt This control system 49A secures a sufficiently low speed of the filtering belt that the level within the waste water container 33 is kept below a certain height. Accordingly, there is established a sufficient length of the upwards rising part 38 of the filtering belt 31 so that the water content of deposited mass upon the filtering belt is kept below 95%, preferably below 90%.

A suction box can be arranged below the upper section of the filtering belt 31 and connected to an extract fan (not illustrated) to further extract water from deposits upon the filtering belt.

FIG. 5 illustrates detail for the guidance of the filtering belt 31. For example, the filter belt can employ a mesh of polyester web having threads of 0,3 mm and holes of 0,3 mm. This will provide a web thickness of 0,6 mm. A transmission belt 51 exhibiting a guiding fin 52 at the underside can be provided as a driving mechanism for the filtering belt. The transmission belt 51 can be constructed of, e.g., polyurethane, optionally having reinforcing threads. Accordingly, it runs over the turn rollers and is conveyed between same on a guide rail 53 with a slot 54 for the guiding fin 52. The guide rail 53 can be constructed of polyethylene and can be fastened to a steel rail 55 connected to the box girder 56 of the cleaning device. The guide rail 53 is at its inner edge provided with an upwards extending flange 57 as a transverse guide for the transmission belt 51.

In order to keep the filtering belt 31 in contact with the transmission belt 51, a clamping rail 58 of polyethylene is arranged over the edge, connected to the box girder 56 with a screw 59 and a pressure plate 60. The guide rail is provided with a downcast fin 61 forming an external and an internal drain groove 62,63. In order to establish pressure against the filtering belt 31 a lip 64 is constructed of a soft material, for example Teflon or rubber, at the edge and having a land surface 65 faced towards the filtering belt 31. The filtering belt 31 is covered by a band 66 in the edge area to protect the filtering belt 31 against wear. The lip 64 is inserted into a slit 67 forming an angle of about 70 degrees with the band plane. A series of screws 68 are fastened at an angle with the slit 67 to anchor the lip 64 within the slit 67.

This construction of the filtering belt 31 guidance provides several advantages, such as decreased wear and a proper sealing effect. The filtering belt can be arranged tightly to the turn rollers and in this way be guided securely, also at high speed.

This construction enables a more effective compression within the screw conveyor 42 than was achievable by former constructions. By providing the outlet pipe 70 with a spring loaded lid 71 it is possible to press the solids to effect a dewatering of the same within the outlet pipe. The outlet pipe 71 is perforated at the end of the screw conveyor 42 and is provided with a collecting jacket 72 with a drain pipe 73.

What is claimed is:

1. A cleaning device for cleaning waste water, comprising:
    a waste water container for receiving a flowing supply of waste water;
    an endless filtering belt guided through the container for filtering the waste water, the belt passing over a series of turn rollers that define an upward rising section and a horizontal section wherein residue trapped on the belt faces downward;
    control means for controlling the speed of movement of the filtering belt relative to the supply of waste water to maintain the waste water surface below a selected level and thus obtain a strong dewatering within the upward rising section of the filtering belt;
    a blowoff device mounted over the horizontal section of the filtering belt with a front end side facing toward the filtering belt for blowing air towards the filtering belt, the blowoff device having an elongated slit having an expanding section expanding from a constriction, and a curved transition region leading from the expanding section to the front end side of the blowoff device;
    a nozzle pipe for spraying water jets toward the filtering belt, the nozzle pipe being mounted in parallel with the blowoff device and downstream thereto; and
    a screw conveyor arranged below the blowoff device for removing the residue dislodged from the filtering belt.

2. The cleaning device in accordance with claim 1, wherein the front end side is in contact with the filtering belt.

3. The cleaning device in accordance with claim 1, wherein the expanding section of the slit is rectilinear.

4. The cleaning device in accordance with claim 3, wherein the expanding section has an opening angle of about 20 degrees.

5. The cleaning device in accordance with claim 1, wherein the width of the constriction is about ⅓ of the length of the slit.

6. The cleaning device in accordance with claim 1, further comprising a transmission belt in contact with a portion of the filtering belt for moving the filtering belt in unison with the transmission belt; and
    a clamping rail stationarily located adjacent the rising section of the filtering belt for pressing the filtering belt against the transmission belt.

* * * * *